United States Patent [19]

Murahashi et al.

[11] Patent Number: 5,901,276
[45] Date of Patent: * May 4, 1999

[54] IMAGE FORMING APPARATUS HAVING AN INTERFACE TO CONNECT WITH OTHER IMAGE FORMING APPARATUS

[75] Inventors: Takashi Murahashi; Utami Soma; Jun Yokobori; Susumu Kurihara, all of Hachioji, Japan

[73] Assignee: Konica Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/575,165

[22] Filed: Dec. 19, 1995

[30] Foreign Application Priority Data

Dec. 22, 1994 [JP] Japan .................................. 6-320319

[51] Int. Cl.$^6$ .................................................. G06F 15/00
[52] U.S. Cl. ........................................ 395/112; 395/114
[58] Field of Search .................................. 395/112, 113, 395/114, 101, 115, 116, 200.38, 200.39, 200.4, 200.41, 200.43, 200.44, 200.45, 200.46, 825, 826; 358/468, 437, 435, 436, 442, 403, 402, 407, 408, 444, 404, 434, 438, 439

[56] References Cited

U.S. PATENT DOCUMENTS 5,027,386  6/1991  Hisano ..................................... 379/100
5,257,117  10/1993  Kang et al. .............................. 358/468
5,627,658  5/1997  Connors et al. ........................ 358/407

OTHER PUBLICATIONS

Canon; "Laser Class® 7000/7500" Plain Paper Facsimile; Instruction Book; Copyright 1993; pp. 8, 32–35, 58, 64, 120–121, 144–148 and 157.

*Primary Examiner*—Edward L. Coles
*Assistant Examiner*—Dov Popovici
*Attorney, Agent, or Firm*—Frishauf, Holtz, Goodman, Langer & Chick

[57] ABSTRACT

An image recording apparatus, such as a copier or a printer which is capable of connecting with another recording apparatus, includes: a memory for storing image data corresponding to plural document pages; a mode selector for selecting one of a master mode in which the image data, stored in the memory, are transferred to the other image recording apparatus, and a slave mode in which the image recording apparatus receives image data transmitted from the other image recording apparatus; and a transmission/receiving controller for controlling transmitting and receiving of the image data according to the selection of one of the master and the slave modes. In the apparatus, the image data transmitted from the other image recording apparatus are stored in the memory and the image corresponding to the image data stored in memory is recorded on a recording paper. The recording operation is independent from an operation of the other image recording apparatus when the slave mode is selected.

23 Claims, 8 Drawing Sheets

IMAGE FORMING APPARATUS HAVING AN INTERFACE TO CONNECT WITH OTHER IMAGE FORMING APPARATUS

BACKGROUND OF THE INVENTION

The present invention relates to an image-recording apparatus, which is able to connect to another recording apparatus, particularly the present invention relates to an image-recording apparatus according to which productivity of image-formation in image-recording system and operation performance thereof can be enhanced.

Heretofore, a recording apparatus has been known to record identical image data by combining a plurality of recording apparatuses and simultaneously sending an image formation order to those apparatuses. Since the recording apparatus usually conducts an initial setting operation preparing for image-forming operation such as pre-functional rotation, after receipt of a print order and because timing for generating entry signal to start writing differs depending on respective apparatuses, it has been necessary to level out variations among the apparatuses.

In order to comply with this demand, a recording apparatus has been proposed in which the order of image writing-in permission signals are judged, a reading operation is initiated in the image-reading section in synchronization with the preceding image writing-in signal and the image signals are transferred to the preceding recording apparatus. On the other hand, in synchronization with the preceding image writing-in permission signal, the image reading section simultaneously transfers the image signals to the plurality of recording apparatuses, with different writing-out timings so as to compensate the transfer timing to the recording apparatuses and, thus to form plurality of images. This been proposed in Japanese Patent O.P.I., Publication No. 62-263771(1987).

Further, in order to even out irregularities among the apparatuses, it has been considered to provide a large scale memory for common use to the plurality of recording apparatuses, by which the irregularities are managed by a single controlling section and operating section.

However, the above-mentioned latter apparatus stores the image data to an exclusive memory which is commonly used by plural recording apparatuses and controls the image data by a single control section and an operating section. Therefore, when the printing speeds of the plural recording apparatuses vary, it becomes unrealistic to synchronize the operation among the plural recording apparatuses in reading out the image data to be recorded from the memory.

Further, in the above-mentioned apparatus of the prior art, in order to synchronize timings of the connected recording apparatuses, output has been started after completion of reading and memorizing all the information of an original, so that output of a first copy is remarkably delayed.

In the prior art technology, a processing number has not been allocated in the light of the printing speeds of the respective recording apparatuses; therefore, productivity of image-formation of the total recording apparatus which constitutes an image recording system has tended to be lowered.

Further in accordance with the prior art technology, in the case while outputting an image by connecting a plurality of image recording apparatuses to each other, an input signal is not processed for masking since the apparatuses are operated by an image signal from outside (i.e., they are slave image recording apparatuses), so that mis-operations have been caused by human carelessness.

SUMMARY OF THE INVENTION

The first object of the present invention is to simplify the connection, the synchronization, and further the control among plural recording apparatuses, each having a different printing speed to others, with a simple configuration by independently operating the recording apparatuses after the image data and processing conditions are transmitted to them.

The second objective of the present invention is to enable the recording apparatus of the master side to attain real time output of the first copy.

The third objective of the present invention is to prevent confusion of button operations at the time of connection by restricting input with operation buttons on the slave side in the image recording system which distributes identical image data from the recording apparatus on the master side, thus, to enhance practicality.

The fourth objective of the present invention is to attain enhancement of productivity of image formation with respect to all of the apparatuses which make up the image recording system by distributing processing sheet numbers to the connected recording apparatuses in accordance with their processing speeds.

The first objective of the present invention can be attained by an image recording apparatus which includes:

a memory means for memorizing image data of plural of pages;

a mode selection means having a master mode, in which the image data memorized in the memory means are transmitted to another image recording apparatus, and a slave mode, in which the apparatus receives image data transmitted from another image recording apparatus; and a transmitting/receiving controller means for controlling transmitting or receiving image data, by which image data are either transmitted or received depending on the mode assigned by the mode selection means;

in which, when the slave mode is selected by the above-mentioned mode selection means, the image data transmitted from the another image recording apparatus are transmitted to the above-mentioned memory means, and an image is recorded on a recording paper independent from the operation of the another image recording apparatus based on the image data memorized in the above-mentioned memory means. Thereby, connections and parallel operations, among the recording apparatuses having different printing speeds, are easily realized by a simple configuration.

The second objective of the present invention can be realized by an image recording apparatus which includes: a reading means for reading an original document; a memory means for storing image data of plural pages which are scanned by the reading means; a mode selection means for selecting either a master mode with which the image data stored in the memory means is transmitted to other image recording apparatuses or a slave mode with which image data transmitted from other image recording apparatuses are received; and a transmission/receiving control means for transmitting or receiving the image data in accordance with the mode selected by the mode selection means. The image recording apparatus stores the image data, which is scanned by the image reading means, in the memory means and simultaneously records an image on a recording sheet according to the image data when the master mode is selected by the mode selection means. The image recording apparatus stores the image data, transmitted to the other image recording apparatuses, page by page in the memory means, then records the images on recording sheets in accordance with the image data when the slave mode is selected by the mode selection means; thereby, real-time output of the first page on the master side recording apparatus becomes possible.

The third objective of the present invention can be realized by an image recording apparatus which includes: a memory means for storing image data corresponding to plural pages; a mode selection means for selecting either a master mode with which the image data stored in the memory means is transmitted to other image recording apparatuses or a slave mode with which image data transmitted from other image recording apparatuses are received; a transmission/receiving control means for transmitting or receiving the image data in accordance with the mode selected by the mode selection means; a display means for displaying the state of selection in the slave mode when the slave mode is selected by the mode selection means; an operation key for inputting an operation command which is independent from the other image recording apparatuses no matter that the slave mode is selected by the mode selection means; and an input means for invalidating the input by the operation key when the slave mode is selected by the mode selection means. Thereby, the image recording apparatus improves the productivity of image recording.

The above-mentioned image recording apparatus has an interrupting means, and while the slave mode is selected by the assignment of the above-mentioned mode selection means, the above-mentioned input controlling means can allow an input by the above-mentioned interrupting means.

As the means for attaining the fourth objective of the present invention, it is possible to avoid confusion in button operation at the time of connection, by an image recording apparatus, which includes: a memory means for memorizing image data of plural of pages; a recording means for recording an image on a recording paper based on the image data memorized in the memory means; a transmitting means for transmitting the image data memorized in the memory means to another image recording apparatus; a receiving means for receiving processing speed information from the other image recording apparatus; a determination means for determining a processing condition in the other image recording apparatus based on the processing speed information received from the other image recording apparatus; and a control means for controlling the transmitting means so as to transmit the processing condition determined by the determination means to the other image recording apparatus.

It is characterized in the apparatus that the above-mentioned processing condition is the recording number to be processed on the recording sheet based on the image data sent from said sending means.

DETAILED DESCRIPTION OF THE INVENTION

Hereinbelow, an electrical and mechanical structure of the image recording apparatus of the present invention is explained with reference to one example of the present invention.

Figure 1:
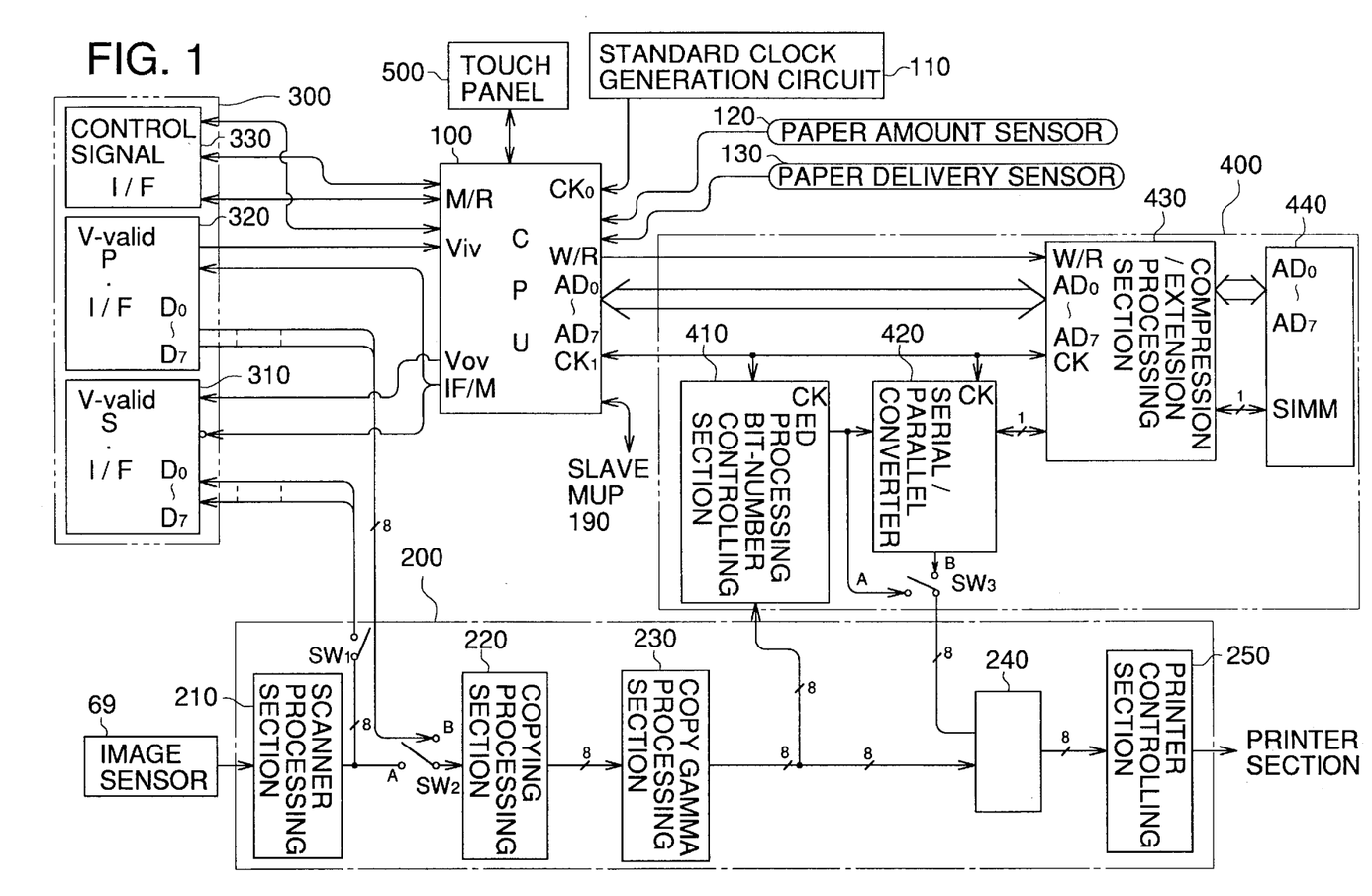
FIG. 1 is a block chart illustrating electric circuit of controlling operation according to one example of the image recording apparatus of the present invention.
Figure 7:
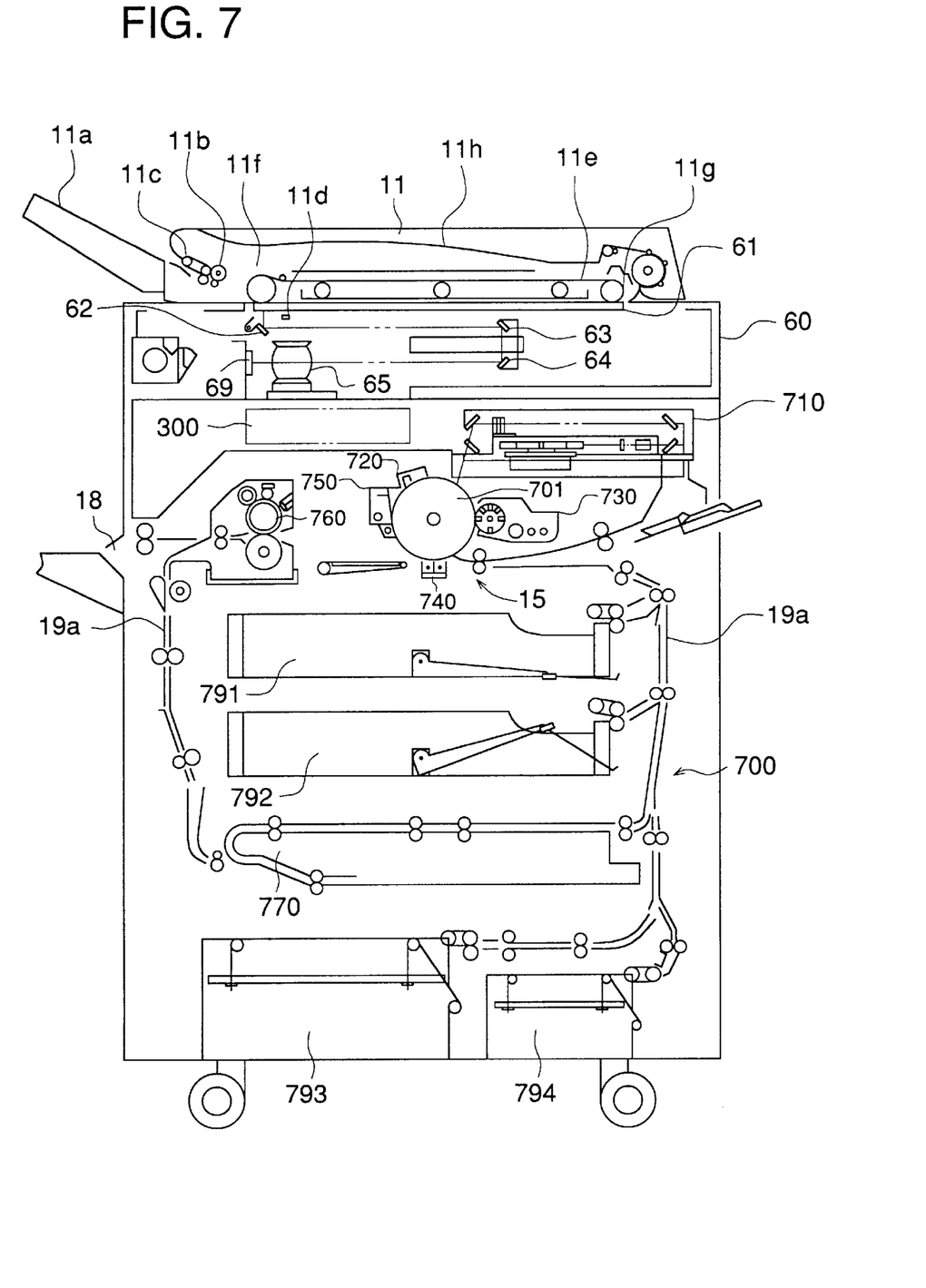
FIG. 7 a cross-sectional view showing the mechanical structure in the image recording apparatus of the present example.

FIG. 1 is a block chart illustrating an electric circuit according to one example of the image recording apparatus of the present invention, and FIG. 7 is a cross-sectional view showing the mechanical structure of the image recording apparatus according to the present example.

The image recording apparatus used in the present example is equipped with so-called a RDH function, by which images can be recorded without deteriorating originals, by being equipped with memory means 400 for storing the image data from scanner section 60 (this corresponds to the reading mean) and printer section 700, which corresponds to a recording means, to read the image data from the memory means 400 and print them out.

Moreover, this image recording apparatus is equipped with interface 300 to connect apparatuses with each other by configuring an image recording systems with plural apparatuses in order to accomplish the function of recording images from identical image data; and a ROM memory which stores the following programs: a program corresponding to the mode setting means which sets the master mode that image data is read out from a document and transmitted when the pressure on the display button, provided on the touch panel 500, is detected, and further sets the slave mode that the image data is received when a connection mode signal from outside apparatus is received; a program which activates the recording means, independently to the recording timing of the outside image recording apparatus in the master mode and with which the image data are inputted, when the slave mode is selected; a program corresponding to the signal path setting means which turns the switches $SW_1$ and $SW_2$ so that scanner processing section 210 is connected to scanner interface 310 and copying processing section when the master mode is selected; a program which sets the processing conditions of the copy number allocation according to the processing speeds of recording apparatuses in the slave mode by requesting them to obtain the processing speeds when the master mode is set; and a program corresponding to the display input control means which displays the state of a connecting operation on the touch panel 500, which corresponds to a display, at the same time, controls to apply a masking operation upon the inputted signal from a control button on the touch panel 500, and further controls to accept an urgent copy during the connecting operation by pressing the interruption button on the touch panel 500 when the slave mode is set. The image recording apparatus is further equipped with CPU 100, which executes the programs stored in the ROM memory at the predetermined timings, and an automatic document conveyance apparatus 11. Hereinafter, the respective section are explained in detail.

CPU 100 is connected with a terminal from paper amount detecting sensor 120, to detect that recording papers stored in the paper supplying trays 791 through 794 are vacant, and a terminal from paper discharge sensor 130.

An automatic manuscript transportation apparatus 11, which may hereinafter be abbreviated to ADF, is, as shown in FIG. 7, a device to transport an original manuscript from carrying tray 11a to the pre-determined standard position on the platen 61 one by one and it comprises, the carrying tray 11a, supply roller 11b, separation roller 11c, manuscript detecting means 11d, which is organized with, for example, a LED or a photo-transistor and is arranged on the carrying tray 11a, full-surface-width belt 11e, driving roller 11f, turning roller 11g and motor M, which is not shown in this figure and is connected with the driving roller 11f. The ADF transports the original manuscript to the pre-determined standard position on the platen 61, and, then, discharge the processed manuscript into a discharge tray 11h.

The supply roller 11b, the separation roller 11c, etc. are driven by the motor M, which is not shown in the drawings.

An electromagnetic clutch, which is not shown in the drawings, is provided between the driving roller 11f and the motor M2. An electromagnetic brake, which is not shown in the drawings, is provided with the motor M2 in order to stop transportation of the manuscript at a pre-determined position. A clock disk, which is not shown in the drawings, is provided with the motors M1 and M2, and these disks are respectively equipped with a belt clock interrupter and a discharging paper clock interrupter, which are not shown in the drawings.

A photo-receiving element 11i, consisting of a phototransistor and a document sensor which consists of an LED and is not shown in the drawing, are arranged at the rear side of the platen 61 in the approximate position of the predetermined position and on the side of ADF 11, respectively.

An original document controlling circuit 190, which is not shown in the drawing, is organized surrounding a one-chip micro computer, which is hereinafter referred to as a slave MUP. Moreover, it carries out calculation and control concerning the ADF 11, while exchanging signals with the CPU 100. To the input-output port of the slave MUP, signals from the entrance document signal sensor 11j, which is arranged on the downstream side of the above-mentioned tray 11a, the paper supply sensor, which is provided on the transportation pathway and is not shown in the drawing, signals of the paper discharge sensor 11j, a switch 11i, which detects opening and shutting of the ADF and is not shown in the drawing, are respectively inputted.

To intruding terminals INT1 and INT2, of the slave MUP 190, which are not shown in the drawing, signals from the belt clock interrupter, which detects rotation of the motor by the clock disk attached to the axis of the above-mentioned belt driving motor, and signals from the paper discharge clock interrupter are inputted, which become the standard clock for the moving amount of paper conveyance, and conduct counting operation by the internal counter of the slave MUP.

To the output port of the slave MUP 190, movement signals of the above-mentioned motor M1, motor M2, the electromagnetic brake and the electromagnetic clutch are outputted, output load through drivers is controlled, and exchange signals with the CPU 100 is conducted through cables. To the input port of the slave MUP, the document detection signal, document supply signal, document discharge signal and mode selection signal are inputted and the copy demand signal and the document detection signal are outputted from the output port.

Scanner 60 comprises, as shown in FIG. 7, a light source (not shown) to irradiate a white light beam from underneath to an original document, whose position is fixed to a reference position on platen 61; the first mirror 62, provided on a moving member for supporting the light source and moving, to reflect the light from the original document; a V-shape mirror in which the second mirror 63 and the third mirror 64, for reflecting the light from the first mirror 62, are provided faced to each other; and focusing lens 65 to focus the light from the V-shape mirror onto the receptor portion of image sensor 69.

The scanner 60, which is shown in FIG. 1, carries out analog/digital conversion(hereinafter referred to as A/D conversion) of the illuminance signals obtained by photoelectrically converting reflection image signals from the original received by an image sensor 69, as well as conducting serial-parallel conversion, to send out the image signal to a scanner processing section 210, which constitutes an image processing section 200.

The image processing section 200 includes, as shown in the drawing, a scanner processing section 210, which undergoes AOC, AGC, shading and dark corrections to the image data sent out from the scanner 60, in order to realize faithful image tone reproduction from shadow portion to high light portion of an image; a copy processing section 220, which carries out EE processing, image judgment, luminance-density conversion, frame eliminating process, effective image region control, and spatial filtering and magnification operations which compensate the effects of MTF on lens in the optical system, vibrations of the optical mirrors and others caused by matters of fixing precision of a line sensor, optical system movements, and inconsistency of scanning speeds; a copy gamma processing section 230, which determines effective image domain; a selector 240, which performs image composition; and a printer control section 250, which carries out gamma control, effective image region control, frequency conversion, INDEX synchronization, and PMW control. The image processing section 200 also includes a switch $SW_1$, which switches the output terminal from the scanner processing section 210 to connection state with the input terminals $D_0$ through $D_7$ of the scanner interface 310, and a switch $SW_2$, which selectively connects to either one of the data input terminal of the copy processing section 220, the scanner processing section 210 and the output terminals $D_{00}$ through $D_{07}$ of the printer interface 320.

Printer control section 250 is provided with a modulation circuit, which is not shown in the drawing, a LD driving circuit, which is not shown in the drawing, and an index sensor, which is not shown in the drawing, and an index detection circuit, which is not shown in the drawing, as a synchronization system. A polygonal driver, which is not shown in the drawing, has been provided as a polarization optical system. The modulation circuit is a device to convert a signal to a multiple-value signal which is obtained by comparing the analog recording signal with the reference wave. The analog recording signal is obtained by DIA converting a recording signal in a predetermined bit number. The modulation signals thus obtained become driving signals for the LD driving circuit. The LD driving circuit is a device to emit semi-conductive laser light 711 by the modulation signals. This is a device which drives so as to equalize the amount of light by feeding back the signals corresponding to the amount of the beam light emitted from the semi-conductive laser 711, and it is designed to control an electric current conducting to the semi-conductive laser 711. Electric potential of a latent image can be adjusted by this configuration. The synchronization system injects light into the index sensor, which is not shown in the drawing, through a mirror, which reflects light beam from the polarization optical system and is not shown in the drawing. The index sensor outputs electric current responding to the beam, and the electric current undergoes electric current/voltage conversion in the index detection circuit and is outputted as index signals. Surface position of the polygonal mirror, rotating at a pre-determined rotation speed, is detected with this index signal, and light scanning by modulation signals by raster scanning method.

Interface 300 is a member to transmit or receive the data, control signals, etc. to or from the outside apparatus, and is equipped with a scanner interface 310, which is hereinafter abbreviated to S·I/F, the printer interface 320, which is hereinafter abbreviated to P·I/F, control signal I/F 330, etc. The S·I/F 310 and the P·I/F 320 are equipped with image data terminals $D_0$ through $D_7$ and $V_{-valid}$ terminal, are connected to a one-direction bus, and to mask signals depending on the condition of the mode signal. The control signal I/F 330 for communicating with the control signal is a serial I/F to transmit or receive mode information, error information, number of recording information, processing information and etc., and is connected to the CPU 100.

Memory means 400 is a device to compress the image data and write them in image memory 440. It is also a device to decompress the image data and read out from the image memory 440. It has a switch $SW_3$, which selectively connect either one of ED bit number control section 410, serial/parallel converter 420, compression/decompression processing section 430 and image memory 440, and data output terminal $D_{out}$ to one of the output terminals of ED bit control section 410 and serial/parallel converter 420. ED bit control section 410 is a device to determine the length of an image data corresponding to Dither process by the error diffusion method and image kind, and is a device to determine the data length of an image data by the control signal from the CPU 100. The data length is 8-bits in the case of a gradation image and it is reduced to 2-bits in the case of a line image. Serial/parallel conversion section 420 is a device to convert image signals between serial signals and parallel signals. The image memory 440 requires such serial/parallel conversion section 420, because the image data are transmitted serially in the image memory 440, whereas other circuits transmits the image data in parallel. The compression/decompression processing section 430 reversibly carries out, in accordance with the direction of data flow, compression in which image data are processed to be compressed according to the control signal from CPU 100 and store the image data in the image memory 440 for each page, and decompression in which the image data are read out from the image memory 440 page by page, processed to be decompressed, and sent to the serial/parallel converter 420. The compression/decompression means 360 is equipped with a structure to carry out plural manners of compressions. For example, it is possible to choose and execute either the compression method that gray scale images such as photographic images are mainly subjected, or the compression method that character images are mainly subjected and has a better compression rate. The selection of the compression methods is performed by a user with a switch on the touch panel 500. The compression/decompression processing section 430 transmits to the CPU 100 a storing/reading-out flag, indicating the state of storing/reading-out operation of the image data, and the first address. Thereby, the CPU 100 is equipped to manage the operation status of the memory means.

The touch panel 500 is to input various parameters by, for example, displaying the input keys of the parameters, such as a magnification ratio and a number of copies, on a liquid crystal display and pressing them. Especially, it is provided with a display to select the master mode, a line image priority switch to select a compression method, a gray scale priority switch, and an interruption switch which allows the interruption during the switch connection operation to select a memory-capacity-plus-one mode. The touch panel 500 changes the control operation from the CPU 100 by transmitting the parameter, corresponding to the pressed display, to CPU 100. In the present example, the CPU 100 is to control the display of the touch panel 500; however, it is possible to provide a display control section in the touch panel 500 so as to perform a masking process and a interruption process in the slave mode.

The printer section 700 is a printer such as the one using an electrophotographic method. The printer executes the electrostatic photographic process of charging, developing, transferring, separating, and fixing by being provided with the writing apparatus 710, the charging apparatus in the circumference of the image-carrying member 701, the developing apparatus 730, the transferring and separating apparatus 740, the cleaning apparatus 750, the fixing apparatus 760, the original document reversing and returning apparatus 770 and recording sheet cassettes 791 through 794. The printer section of the present invention uses the electrophotographic method and is explained accordingly; however, the present invention is not limited to the concrete example but open to other methods such as ink-jet method and magnetic recording method.

In writing apparatus 710, a latent image is formed by irradiating a light beam, from semiconductive laser 711 according to the recording signal, onto the image-carrying member 701 dot by dot so as to line-scan the image-carrying member 701. The scanning is conducted in such a manner that the semiconductive laser 711 is oscillated by the modulated signal, which is subjected to a pulse-width modulation, a laser beam is deflected by a polygon mirror rotating at a predetermined speed, focusing the laser beam into a small spot on the image-carrying member 701 with f$\theta$ lens and the first and the second cylindrical lenses.

The image-carrying member 701 comprises an electro-conductive substrate made of, for example, aluminium and a photoconductive layer, provided thereon. Thickness and dielectric constant of the photoconductive material is 15–30 $\mu$m and 2.0–5.0, respectively. The electro-conductive substratum is grounded. The image carrying member is a cylindrical-shaped photoreceptor, having 180 mm in diameter and comprising coated type OPC capable of being charged in the negative polarity and being rotated to the direction of the arrow at the linear speed of 280 mm/sec or 125 mm/sec. It is provided with encoder 590, which is not shown in the drawing, on the rotation shaft to detect the phase and the encoder 590 sends out phase signals, which shows the phase of the image-carrying member 701, to the CPU 100.

Paper discharge sensor 120, shown in FIG. 1, is provided in the pathway on the discharging side with respect to the fixing apparatus 760, and it sends out detection signals, upon detection of the rear end of the recording paper, to the CPU 100.

The CPU 100 sends out signals, other than the above-mentioned programs, which carries out timing control of the members conducting electrophotographic processes and exchanges signals, which orders exchange of the original document on the platen 61 based on the state of the storing/reading-out flag being sent out from the memory control section 350, to the slave MPU 190.

Figure 8:
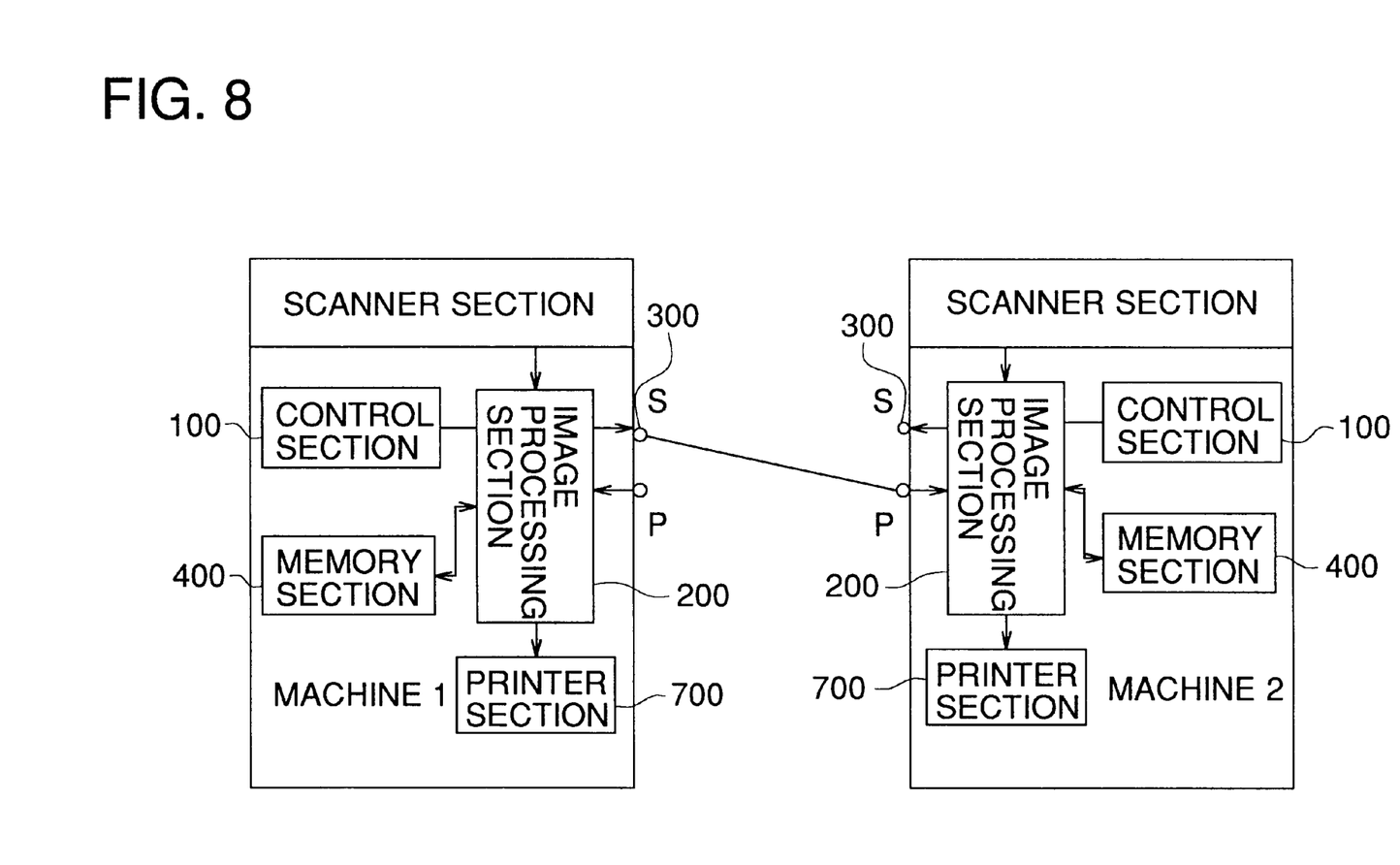
FIG. 8 is a schematic conceptual view illustrating a state when image recording apparatuses according to the present example are connected.

FIG. 8 illustrates a conceptual drawing, which shows the state in which image recording apparatuses are connected according to the example of the present invention.

The image recording apparatus in accordance with the example of the present invention can be connected to plural apparatuses by arranging connecting cables at the interface section 300, and, thus, image recording can be conducted by organizing a image recording system with plural recording apparatuses. As shown in FIG. 8, it is possible to use one of the plural apparatuses as the master apparatus and the rest of them as slave apparatuses. Herein, the master apparatus denotes one which is in the master mode and that is in the state capable of transmitting the image data and etc. from S·I/F 310. It is connected to S terminal in the drawing. The slave apparatus is the one which is in the slave mode and that is in the state capable of receiving the image data and etc. from P·I/F 320. It is connected to P terminal in the drawing.

Below, control operations in the image recording apparatus according to the present example is explained.

Figure 2:
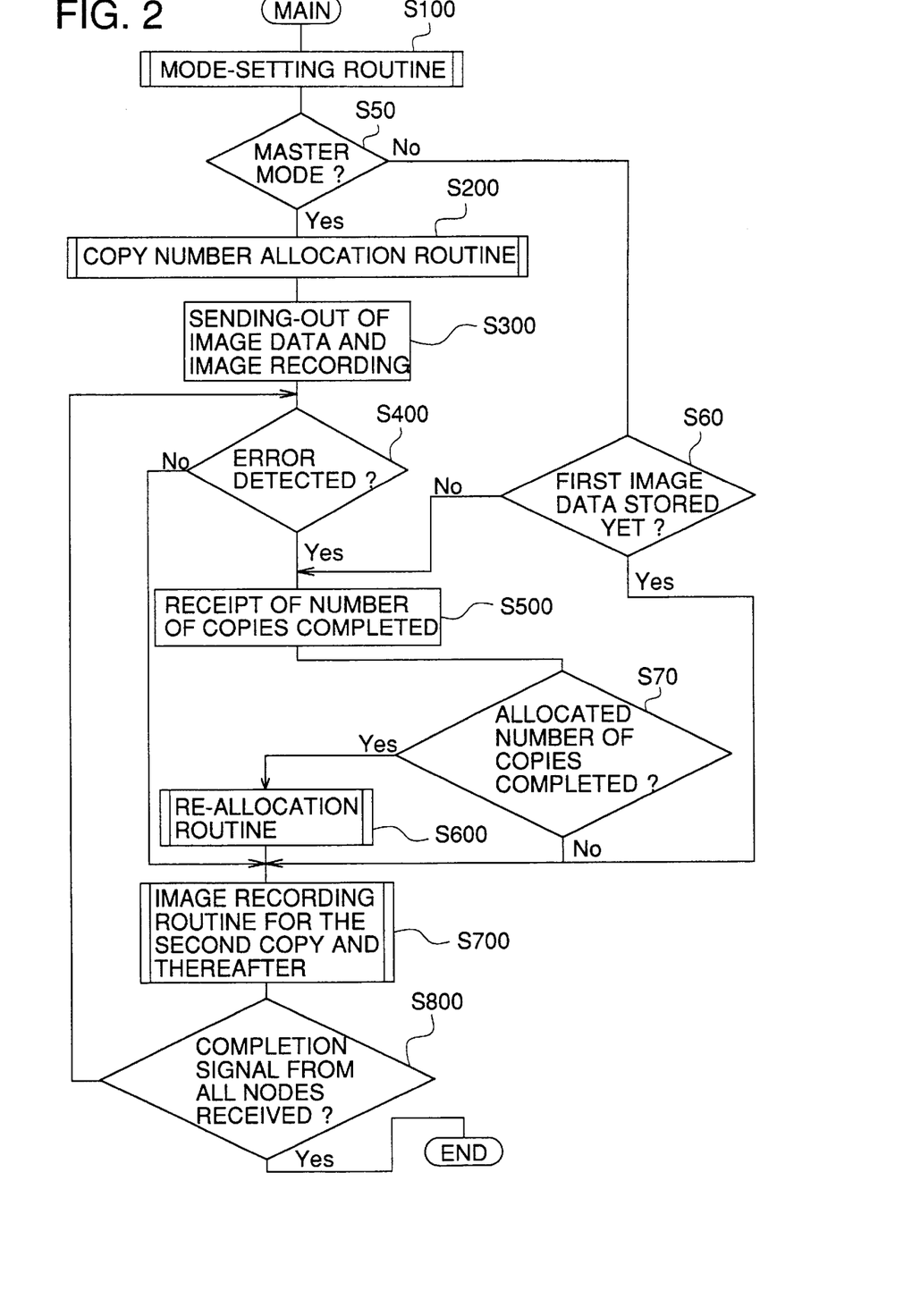
FIG. 2 is a flow chart illustrating the main routine of the processing operation in the image recording apparatus according to the present invention.

FIG. 2 is a flow chart illustrating the main routine of the control operations in the image recording apparatus according to the present example.

The image recording apparatus, when the power source is turned on and the master mode is selected, starts mode-setting routine (step S100) after the initialization process, and if the master mode is selected (step S50), reading-out and image recording of the first image data are performed (step S300) succeeding to booting of copy number allocation routine (step S200). Here, the operation in the step S300 is explained in detail.

Specifically, a user is to press a copy start key. The CPU 100 detects the pressure of the copy start key, and send out original document supply signal to the slave MUP 190. The slave MUP 190 rotates the paper supply roller 11b and conveys the original document placed on the paper loading tray 11a. Separation roller 11c, located between the paper supply roller and the loading tray, separates the original document, which is placed at the lowest position of all loaded on the loading tray 11a, one by one by rotating a separation belt. The original document is nipped between resist rollers, which are in pressure contact with each other, conveyed onto the full-surface-width belt lie by rotation of said resist rollers and is transported to the reference position on the platen 61 by the rotation of the full-surface-width belt 11e. The original document, upon detection of kicking of the sensor by the original document, sends out a signal to the slave MUP 190.

The slave MUP 190, thereby the slave MPU sends out the arrived signal to the CPU 100.

The slave MUP 190 makes V-mirror section, which constitutes the scanner 60, scan the original. By this, the image sensor 69 sends out illuminance signals to the scanner processing section 210 in synchronizm with transfer clocks from basic clock generation circuit 110 by photoelectrically converting the light image focused on the image sensor. The scanner processing section 210 applys shading correction, dark correction, AOC and AAGC to the illuminance signals and at the same time, sends out the analogue/digital converted image data to switch $SW_1$ and switch $SW_2$.

Since the image recording apparatus is in the state of recording operation of the first copy, the CPU 100 carries out storing operation of the original document image in the image memory 440 and transmitting operation of the image data from the S·I/F 310 in parallel. Accordingly, the CPU 100 carries out, in the copying processing section 220, EE processing, image judgment, illuminance-density conversion process, extinguishing process of the framework, control of the effective image region, MTF of the lens in the optical system, spatial filtering for compensating disorders caused by fixing precision of the line sensor, vibration of a optical mirror in the optical scanning, and fluctuation of scanning speed, and magnification process. The CPU 100 sends out the processed image data to the copy gamma processing section 230, determines the effective image area in the copy gamma processing section 230, and sends out to the selecter 240 as well as to send out the image data to the ED bit number controlling section 410 which constitutes the memory means 400. Thereby, in the printer control section 250, modulated signal is obtained by comparing analogue recording signals, obtained by digital/analogue conversion of the recording signal in predetermined bits which is sent out from the selecter 240, with a reference signal, and by digitizing the result into multiple bits. The modulated signal is sent to the LD driving circuit. The LD driving circuit activates the semi-conductive laser 711. The printer control section 250 drives the semi-conductive laser 711 to emit the constant beam light because signals, which indicate the amount of the beam light, are fed back to the printer control section 250. In oscillation system, beam is irradiated into an index sensor, which is not shown in the drawing, through a mirror, which is not shown in the drawing and reflects the beam, from polarization optical system. The index sensor outputs electric current responding to the beam, and the electric current is subjected to electric current/voltage conversion in the index detection circuit and is outputted as an index signal. The surface position of the polygon mirror, which is being rotated at a predetermined speed according to the index signal, is detected, and light scanning by the modulated signal is carried out by raster scanning method. Thus, by continuously driving the electrophotographic processing section by the CPU 100, images are reproduced on the transfer paper.

On the other hand, in parallel with this, the CPU sends out a signal to select a compression method selected in the reproduction mode, as well as the CPU activates write/read signal; thus, the CPU 100 orders accumulation of images and sends out the top address, in order to store the data, to the compression/decompression processing section 430. At this time, the CPU 100 maintains, as mentioned above, the initial value in ACR and the final address in LAR.

The compression/decompression processing section 430 compresses the image data in the predetermined method and stores them from the top address, and sends back the final address and the storing/reading-out flag to the CPU 100. Thus, the CPU 100 detects the state of the storing/reading-out flag, and if the flag is in the state of "ON", it calculates vacant capacity from the final address and the address maintained at LAR. The CPU 100 activates the original document exchange signal if the vacant capacity exceeds the standard capacity of a page, when it is compared with the capacity of the standard capacity of a page. The slave MUP 190 rotates the paper supply roller 11b and conveys the original document placed on the paper loading tray 11a. Separation roller 11c, located between the paper supply roller and the loading tray, separates the original document, which is placed at the lowest position of all loaded on the loading tray 11a, one by one by rotating a separation belt. The original document is nipped between resist rollers, which are in pressure contact with each other, conveyed onto the full-surface-width belt 11e by rotation of said resist rollers and is transported to the reference position on the platen 61 by the rotation of the full-surface-width belt 11e. The original document, upon detection of kicking of the sensor by the original document, sends out a signal to the slave MUP 190. Thereby, the slave MUP 190 sends out the arrived signal to the CPU 100. In parallel with the above mentioned operation, the original document, which was discharged from the platen 61 by the movement of full surface-width belt 11e, is rotated in the direction of the arrow, nipped and transported, then nipped by the second discharge rollers, which are not shown in the drawing, and is discharged to the paper load tray 11a.

On the other hand, the CPU 100 increments the number in the number of copy counter, and confirms that the number in the number of copy counter is zero. If the number in the number of copy counter is not zero, the CPU 100 repeats the aforementioned process. If it is confirmed that the number in the number of copy counter is zero, the CPU 100 ends the process. In this case, the CPU 100 activates the document exchange signal. Thereby, the slave MPU 190 rotates the document, discharged from the platen 61 by the movement of full-surface-width belt 11e, in the arrowed direction, nips and conveys the document, further nips the document with the discharging second roller, not shown in the drawing, to discharge it to the loading tray 11a.

The image recording apparatus performs the accumulation of the first image data and image recording operation by repeating the above-mentioned operations. Accordingly, the image recording apparatus, according to the present example, makes the real-time output of the first image possible in the recording apparatus on the side of the master by storing the image data in the above-mentioned memory means when the apparatus is set to the master mode, at the same time, sending out the image data to the slave side, and in addition, sending out the identical image data to the printer section and performing recording action.

The CPU 100 confirms communication error and occurrence of jamming (step S400) at the slave side, and when it detects any error, it receives the number of completed copies (step S500), confirms from the counter whether or not allocated number has been completed (step S70). If the allocated number has not been completed, it starts up the image recording routine for the second and following images (step S700), confirms whether completion signals from all nodes(step S800) have been detected. In the negative case, it goes back to step S400 to detect errors. When, for example, error signals from the node, from which error signal had been generated, are extinguished, or the system has recovered from an errorneous condition, then the system proceeds to the step S700, starting up the image recording routine for the second and following copies. The procedure completes, for example, by the detection of the completion signals from all nodes.

In the step S70, when the allocated numbers of copying have been completed, the system proceeds to the step S700 after starting up the re-allocation routine(step S600). Actions mentioned above are series of actions in the master mode.

On the other hand, in the step S100, when the slave mode is selected, it is confirmed that the image data of the first copy has been stored normally(step S60). If there is any writing error, the system goes to the step S500, and if it has been completed normally, then the system goes to the step S700. This is a series of actions in the slave mode.

Below, detailed actions in the respective sub-routines are explained with reference to FIG. 3 through FIG. 6.

Figure 3:
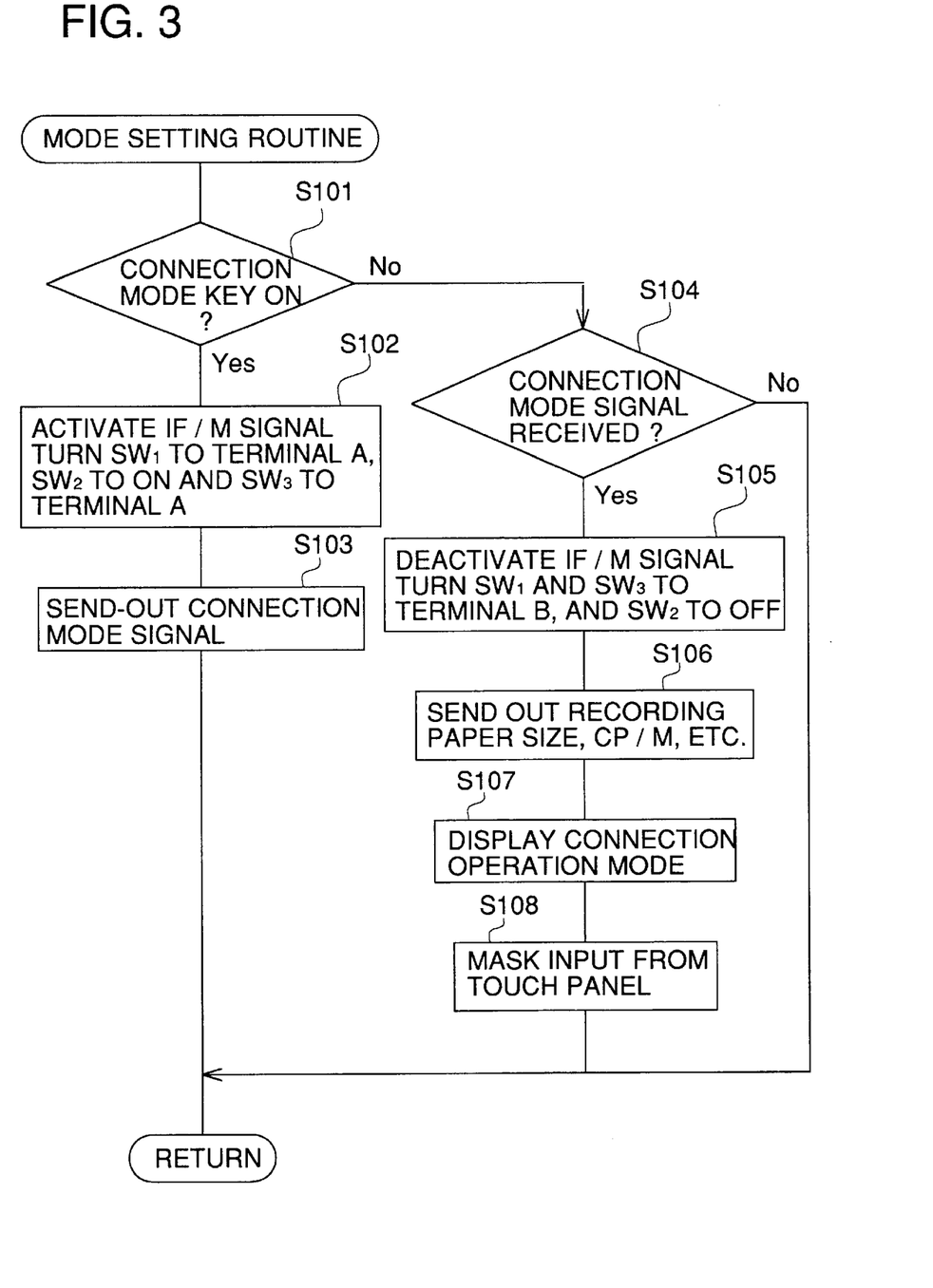
FIG. 3 is a flow chart illustrating the mode selection routine in the image recording apparatus according to the present invention.

FIG. 3 is a flow chart illustrating the mode selection routine in the image recording apparatus according to the present example.

The CPU 100, when the mode-setting routine (step S100) is set up, confirms the presence of the signal, which is to be generated when the connection mode button on the touch panel display 500 is pressed. If the signal from the connection mode button is in the activated state, it switches IF/M signal to an activated state and, at the same time, switches $Sw_1$ and $Sw_2$ to the terminal A and switches $SW_2$ on (step S102). By the series of these operations, the CPU 100 sets the image recording apparatus to the master mode, and subsequent to this, the CPU 100 activates the connection mode signal and goes back to the main routine. Under this condition, the CPU 100 neither displays the connection mode on the touch panel 500 nor masks the signal from the touch panel 500.

Through the touch panel 500, a user inputs and select copy number, number of the original documents, electric RDH mode, reproduction mode and plus-one mode, and places a bundle of the original documents on the paper loading tray 11a. By this, the CPU 100 sets an input value in the copy-number setting counter, and number of original document in the page counter.

The CPU 100, when the signal from the connection mode is non-activated state, confirms whether the code signals of the connection mode from the control signal I/F 330 is received in the step S101 (step S104). If the connection mode signal is in the activated state, it goes to the step S105. By this, the CPU 100 switches the IF/M signal into the non-active state, switches $SW_1$ and $SW_3$ to the terminal B, switches $SW_2$ off and proceeds to the step S106 (step S102). By the above-mentioned operation, the CPU 100 sets up the image recording apparatus in the slave mode.

The CPU 100 sends out data concerning stored recording paper size and CPM (a number of copies per minute) from the control signal I/F of the interface 300 (step S106). Subsequent to this, the CPU 100 displays, in the touch panel 500, the status that the connection mode is selected (step S107). Thus, the CPU 100 informs the status to the user. The CPU 100 masks various kinds of signals from the touch panel 500. By this, confusion, of button operations for the connecting operation in the image recording apparatuses on the slave side, can be prevented. After performing the above-mentioned operations, the system returns back to the main routine. Moreover, when there is a demand of interruption process while the image recording apparatuse in the slave side is in the connection operation, connected copying process is paused at a good page-wise partition and an interruption copying process is performed by pressing an interruption button. After completion of the interruption copying process, the halted connected copying process is resumed. By this, interruption copying of an urgent document becomes possible during the connected copying process of a large volume, and thus practicality is improved.

Figure 4:
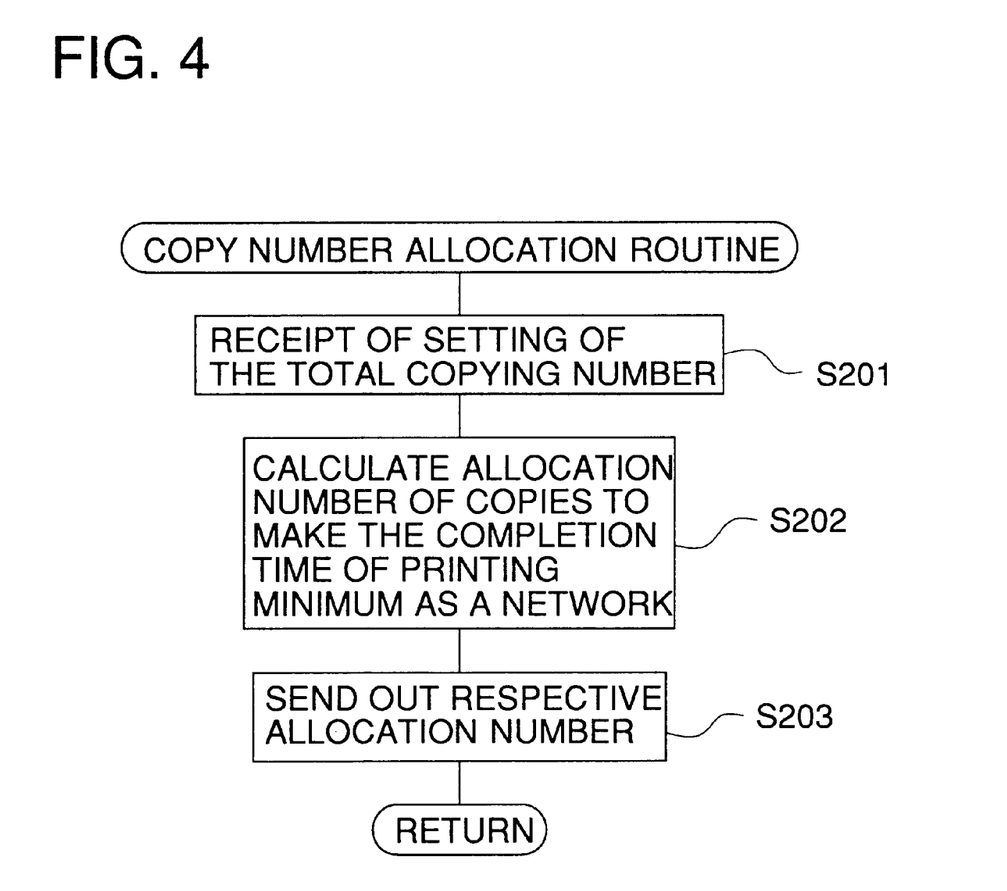
FIG. 4 is a flow chart illustrating the copy number allocation routine in the image recording apparatus according to the present invention.

FIG. 4 is a flow chart illustrating copy number allocation routine in the image recording apparatus according to the present example.

The CPU 100, upon starting up copy number allocation routine (step S200), reads the copying number, which is inputted from the touch panel 500 (step S201), and calculates the number of copies to be allocated according to the CPM data of each slave apparatus so that the printing time of the whole image recording system is minimized (step S202). The CPU 100 sends out the allocated number, which is calculated in the step S202 from the data port 350 of the interface 300 (step S203) and goes back to the main routine. As mentioned above, the image recording apparatus according to the present example can improve productivity of image formation by all the image recording apparatuses, which constitute a network, by allocating the copy numbers in accordance with the printing speed of each of the connected recording apparatuses.

Figure 5:
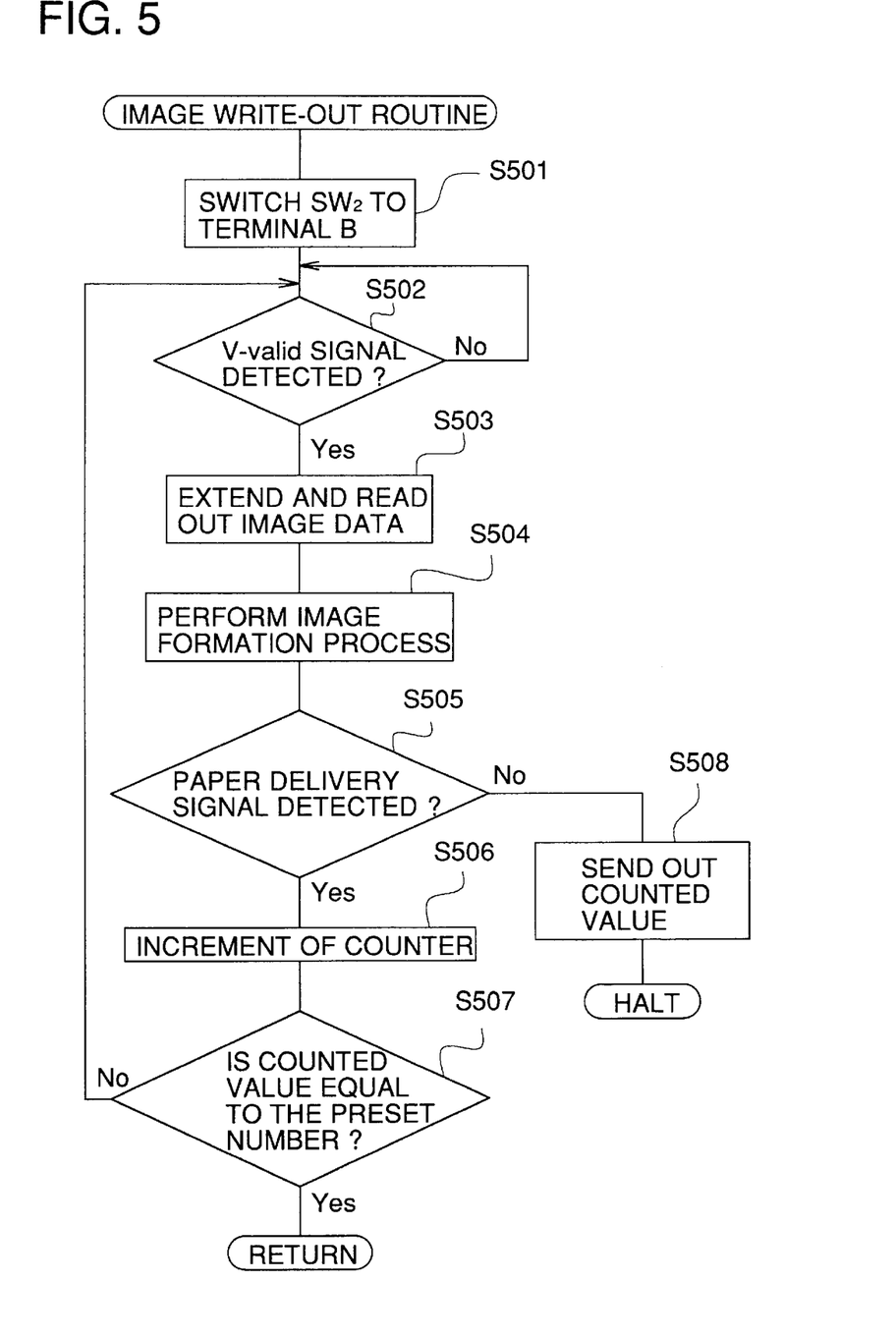
FIG. 5 is a flow chart illustrating the image writing-out routine in the image recording apparatus according to the present invention.

FIG. 5 is a flow chart illustrating image writing routine of the image recording apparatus according to the present example.

The CPU 100, upon starting up the image writing routine (step S500), connects the switch SW$_2$ to the terminal B (step S501), senses V$_{-valid}$ signal (step S502), and orders to read-out by deactivating writing/reading signals. By this, the CPU 100 sends out the read signal and the top address, to read-out the data, to compression/decompression processing section 430.

The compression/decompression processing section 430 applys decompression upon the image data, read out from the image memory 440, sends out serial image data to serial/parallel converter section 420, and at the same time, returns the final addresses of the respective pages and the storing/reading-out flag to the CPU 100. The CPU 100 detects the state of the storing/reading out flag, and when the flag is in the state of "ON", it confirms whether the value of the page counter becomes equal to the preset number of copies (step S503).

In printer controlling section 250, in parallel with the operation of the step S503, the recording signals in predetermined bits from the selector 240 are subjected to digital/analog conversion to form analog recording signals. The analog recording signals are compaired with reference wave and converted into multiple-value signals. The modulation signals, thus obtained, become driving signals of the LD driving circuit. Thus LD driving circuit is a device, which oscillates, the semi-conductive laser generator 711, and signals equivalent to the amount of the beam light from the generator are fed back to the circuit so as to drive the generator so that the amount of light becomes constant. The LD driving circuit is so designed that electric current conducted to the semi-conductive laser generator 711 is variable. By this, electric potential of the latent image can be adjusted. In the synchronization system, a light beam is irradiated to an index sensor, which is not shown in the drawing, through a mirror which reflects the light beam from the polarization optical system. The index sensor outputs electric current in response to the beam, and the electric current is subjected to an electric current/voltage conversion in the index detection circuit and outputted as an index signal from the index sensor.

By this index signal, the surface position of the polygon mirror, rotating at a pre-determined rotation speed, is detected, and light scanning by the raster scanning method with modulated signal is carried out corresponding to the period in the primary scanning direction. Thus, the CPU 100 continuously reproduces images on the transfer paper by driving the writing apparatus 710 and the electrostatic photographic processing section 500 (step S504).

The CPU 100, when it senses that the signal from the paper discharge sensor is in the activated state, increases the page number counter or the copy number counter (step S505), and detect whether or not the number is equal to the pre-determined number (step S507). In the case of negative, the steps S502 through S507 are repeatedly carried out. On the other hand, in the step S507, the value of the number counter is equal to the pre-determined number, then the value of the copy number counter is increased, at the same time, value of the number counter is reset to zero, and it returns to the main routine.

If the detection signal is in the non-activated state in the step S505, an error signal is sent out from the error port 340 of the interface 300 and, at the same time, the values of the number counter and the copy number counter are transmitted from the copy number data port 350 of the interface 300 (step S508). By this, the system becomes in the state of halt until the error is cleared. When the error is cleared, transmission of the error signal is stopped and it returns to the step S506 to continue the recording operation.

As mentioned above, according to the present example, image recording can be performed, not only by an image recording apparatus in the master mode, but also image recording can be carried out by an image recording apparatus in the slave mode without being affected by printing speeds or troubles of the other machines which constitute the image recording system, because image recording can be carried out by reading out the image data from the memory means 400 at the timing of V$_{-valid}$ signal of the image recording apparatus itself after the receipt of the processing conditions and the image data.

Figure 6:
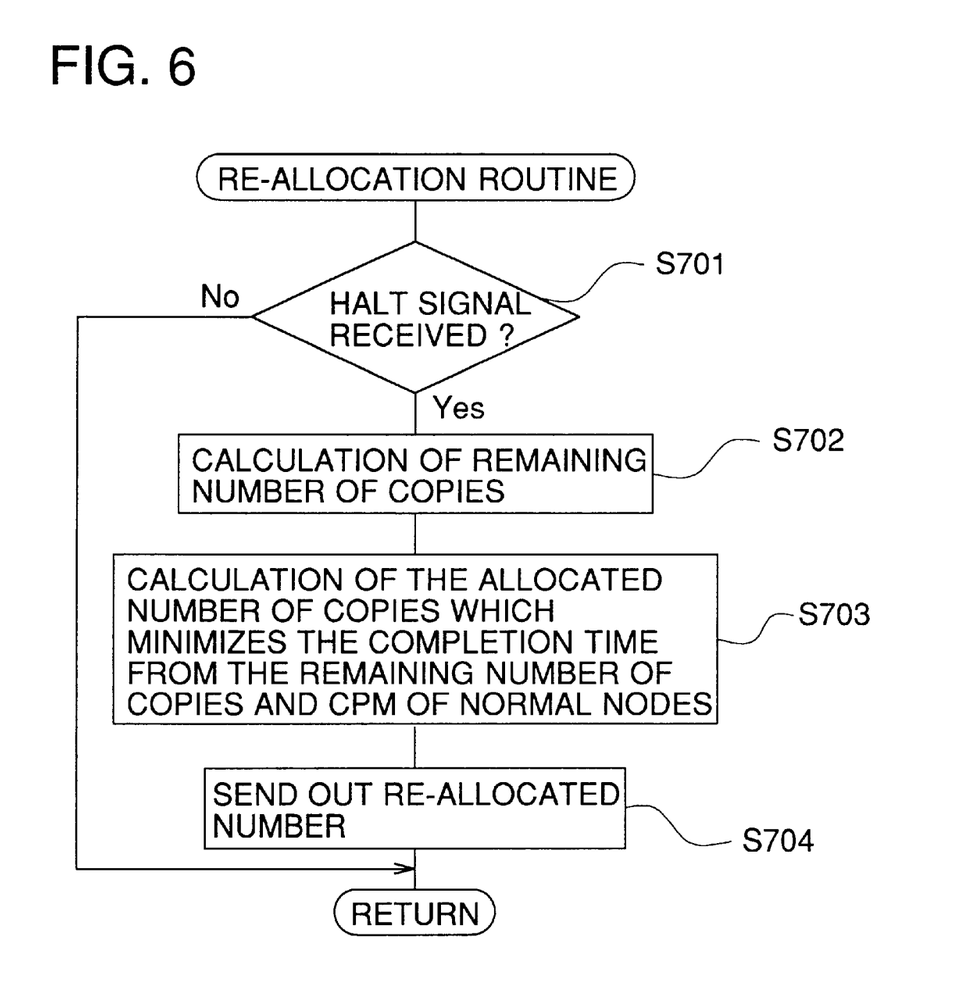
FIG. 6 is a flow chart illustrating re-allocation routine in the image recording apparatus according to the present invention.

FIG. 6 is a flow chart illustrating re-allocation routine in the image recording apparatus according to the present example.

The CPU 100, upon starting up the re-allocation routine (step S700), confirms that a halt signal has been received (step S701), and calculates a residual number of copies to be made by respective nodes, and using completed number of copies, received from the set-up number of copies (step S702). The CPU 100 subsequently calculates allocation number of copies so as to minimize the completion time of printing as a network from CPM data of the respective slave apparatuses (step S703). This is to allocate the completion time of printing to be minimum for the apparatus having the minimum CPM. The CPU 100 sends out respective allocation numbers, calculated in the step S703, from the copy number data port 350 of the interface 300 (step S704), and it goes back to the main routine.

As mentioned above, with the image recording apparatus according to the present example, following-up can easily be made by equipping the re-allocation routine in the case of trouble.

According to the present invention, by providing the above-mentioned structure, connections and parallel operations among plural recording apparatuses, whose printing speeds and other specifications are different from others, can easily be achieved by a simple apparatus structure because the processing condition is fixed in the connecting operation of an early stage and respective image recording apparatuses operate independently after the transmission of a recording command. The control of the recording apparatuses can also be conducted easily by the structure.

According to the present invention, it is became possible to carry out real-time output of the first copy in the recording apparatus on the side of the master.

According to the present invention, since button inputting operation can be restricted at the slave side, confusion of button operation at the time of connection can also be prevented, and practicality is enhanced by providing an interrupt key.

In accordance with the present invention, productivity of image formation, by all of the apparatus which make up the image recording system, is enhanced by providing the above-mentioned structure and allocating the number of copies according to the printing speeds of the respective connected recording apparatuses.

What is claimed is:

1. An image recording apparatus capable of connecting with another image recording apparatus, said image recording apparatus comprising:

an image reader which reads an image of a document so as to obtain image data corresponding to the image of the document;

a memory which stores the image data with respect to at least one of a plurality of document pages;

a recorder which is capable of recording the image of the document on at least one sheet based on the stored image data;

a connector which connects said image recording apparatus to said another image recording apparatus;

a transmission/receiving controller which controls a transmitting operation for transmitting the image data stored in the memory of said image recording apparatus through said connector to said another image recording apparatus, and which controls a receiving operation for receiving image data stored in a memory of said another image recording apparatus through said connector;

a mode selector for selecting said image recording apparatus to operate in one of: (i) a master mode wherein the image data read by said reader of said image recording apparatus and stored in the memory of said image recording apparatus is transferred to said another image recording apparatus by said transmission/receiving controller of said image recording apparatus through said connector, and (ii) a slave mode wherein image data stored in the memory of said another image recording apparatus is received by said transmission/receiving controller of said image recording apparatus through said connector and stored in the memory of said image recording apparatus;

wherein when said image recording apparatus is selected to operate in the master mode, the transmission/receiving controller of said image recording apparatus controls an allocation of a recording operation and the recorder of said image recording apparatus records the read image of the document on the at least one sheet based on the image data; and wherein when said image recording apparatus is selected to operate in said slave mode, the transmission/receiving controller of said image recording apparatus controls the memory of said image recording apparatus to receive the image data stored in the memory of said another image recording apparatus and controls the recorder of said image recording apparatus to record an image of a document read by a reader of said another image recording apparatus as a parallel recording operation based on the image data received from the memory of said another image recording apparatus, in accordance with an allocation of a recording operation of a transmission/receiving controller of said another image recording apparatus.

2. The image recording apparatus of claim 1, further comprising:

a display unit which displays a selection of said slave mode when said slave mode is selected;

an operation key which inputs an operation command which is independent from an operation of said another image recording apparatus regardless of whether said slave mode is selected by said mode selector; and an input unit which invalidates an input by said operation key when said slave mode is selected by said mode selector.

3. The image recording apparatus of claim 1, further comprising:

interrupting means for interrupting an operation of said image recording apparatus; and wherein said mode selector allows an input by said interrupting means when said slave mode is selected by said mode selector.

4. The image recording apparatus of claim 1, wherein said image recording apparatus is a master apparatus, and said another image recording apparatus is a slave apparatus.

5. The image recording apparatus of claim 4, wherein when the master mode is selected, the image data is sent to said recorder of the master apparatus while said image reader of the master apparatus reads the image of the document.

6. The image recording apparatus of claim 4, wherein when the master mode is selected, the image data is sent to the memory of the slave apparatus while said image reader of the master apparatus reads the image of the document.

7. The image recording apparatus of claim 4, wherein:

when the master mode is selected, the image data is sent to the memory of the slave apparatus in parallel with said image reader of the master apparatus reading the image of the document; and after storing the image data in the memory of said slave apparatus, A recorder records the image on the basis of the image data stored in said memory of said slave apparatus.

8. The image recording apparatus of claim 4, further comprising:

an input unit which inputs a number of copies for recording an image of the document; and wherein said transmission/receiving controller controls said allocation by calculating each number of copies to be allocated between the master apparatus and the slave apparatus from the number of copies input by said input unit.

9. The image recording apparatus of claim 4, wherein:

when the master mode is selected, said transmission/receiving controller of the master apparatus communicates data concerning stored sheet size of the slave apparatus with the master apparatus, determines said allocation between the master apparatus and the slave apparatus on the basis of processing speed information of the slave apparatus and the master apparatus, and further communicates the allocation of the slave apparatus with the slave apparatus.

10. The image recording apparatus of claim 4, wherein:

when the master mode is selected, said transmission/receiving controller of the master apparatus controls a reallocation by an occurrence of an error in the slave apparatus.

11. The image recording apparatus of claim 10, wherein the master apparatus controls the reallocation on the basis of a residual number of copies.

12. The image recording apparatus of claim 4, wherein:

when the slave mode is selected, an image corresponding to said image data stored in said memory of said slave apparatus, which is transmitted from the master apparatus, is recorded on the sheet by a recorder of the slave apparatus in accordance with the allocation for the slave apparatus independent of a recording operation in the master apparatus.

13. The image recording apparatus of claim 4, wherein said transmission/receiving controller of the master apparatus transmits the image data stored in the memory to the recorder of the master apparatus.

14. An image recording system capable of connecting with a plurality of recording apparatus, comprising:

a master image recording apparatus;

a slave image recording apparatus;

each of said master and slave recording apparatus having:
- an image reader which reads an image of a document so as to obtain image data corresponding to the image of the document;
- a memory which stores the image data, wherein the memory is capable of storing the image data corresponding to a plurality of document pages;
- a recorder which records the read image of the document on a sheet based on the stored image data;
- a connector which connects said master image recording apparatus with said slave image recording apparatus;
- a transmission/receiving controller which controls transmitting and receiving of said image data through said connector;

wherein the image data read by said reader of the master apparatus is transmitted from the master apparatus to the slave apparatus by said transmission/receiving controller, and the slave apparatus stores the transmitted image data in the memory thereof;

wherein the transmission/receiving controller of the master apparatus controls an allocation of recording operation for the master apparatus and the slave apparatus, the transmission/receiving controller of the master apparatus transmits the image data to the recorder of the master apparatus so as to record the image of the document by the recorder thereof in accordance with the allocation for the master apparatus, and the transmission/receiving controller of the master apparatus further transmits the image data to the slave apparatus; and the transmission/receiving controller of the slave apparatus controls to receive the image data in the memory of the slave apparatus so as to record the image of the document by the recorder of the slave apparatus in accordance with the allocation for the slave apparatus as a parallel operation to a recording operation of the image of the document by the master apparatus.

15. The image recording system of claim 14, wherein each of said master and slave apparatus further comprises:
- a mode selector which selects one of a master mode wherein the image data is read by said image reader and is transferred to said slave image recording apparatus by said transmission/receiving controller as the master apparatus, and a slave mode wherein said slave image recording apparatus receives the image data transmitted from said master apparatus by the transmission/receiving controller as the slave apparatus.

16. The image recording system of claim 14, wherein:
said transmission/receiving controller of the master apparatus communicates a processing speed information of the slave apparatus with the master apparatus, determines said allocation between the master apparatus and the slave apparatus based on the processing speed information of the slave apparatus and the master apparatus, and further communicates the allocation for the slave apparatus with the slave apparatus.

17. The image recording system of claim 14, wherein the image data is sent to said recorder of the master apparatus while said image reader of the master apparatus reads the image of the document.

18. The image recording system of claim 14, wherein the image data is sent to the memory of the slave apparatus while said image reader of the master apparatus reads the image of the document.

19. The image recording system of claim 14, wherein each of said master and slave apparatus further comprises:
- an input unit which inputs a number of copies for recording an image of a document; and
- wherein said transmission/receiving controller of the master apparatus controls said allocation by calculating each number of copies to be allocated between the master apparatus and the slave apparatus from the number of copies input by said input unit.

20. The image recording system of claim 16, wherein:
said transmission/receiving controller of the master apparatus communicates data concerning stored sheet size of the slave apparatus with the master apparatus, determines said allocation between the master apparatus and the slave apparatus based on the processing speed information of the slave apparatus and the master apparatus, and further communicates the allocation for the slave apparatus with the slave apparatus.

21. The image recording system of claim 14, wherein the image corresponding to said image data stored in said memory of the slave apparatus is recorded on the sheet by said recorder of the slave apparatus in accordance with the allocation for the slave apparatus in parallel with the recording operation by the master apparatus.

22. The image recording system of claim 15, wherein:
when the master mode is selected, said transmission/receiving controller of the master apparatus communicates a processing speed information of the slave apparatus with the master apparatus, determines said allocation between the master apparatus and the slave apparatus based on the processing speed information of the slave apparatus and the master apparatus, and further communicates the allocation for the slave apparatus with the slave apparatus.

23. The image recording system of claim 19, wherein said transmission/receiving controller of the master apparatus communicates a processing speed information of the slave apparatus with the master apparatus, determines said allocation between the master apparatus and the slave apparatus based on the processing speed information of the slave apparatus and the master apparatus, and further communicates the allocation for the slave apparatus with the slave apparatus.

* * * * *